(12) United States Patent
Deevi et al.

(10) Patent No.: US 7,491,675 B2
(45) Date of Patent: Feb. 17, 2009

(54) NANOCOMPOSITE COPPER-CERIA CATALYSTS FOR LOW TEMPERATURE OR NEAR-AMBIENT TEMPERATURE CATALYSIS AND METHODS FOR MAKING SUCH CATALYSTS

(75) Inventors: Sarojini Deevi, Midlothian, VA (US); Sohini PalDey, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 631 days.

(21) Appl. No.: 10/950,663

(22) Filed: Sep. 28, 2004

(65) Prior Publication Data
US 2005/0065023 A1    Mar. 24, 2005

Related U.S. Application Data

(62) Division of application No. 10/314,449, filed on Dec. 9, 2002, now Pat. No. 6,857,431.

(51) Int. Cl.
*B01J 23/00* (2006.01)
*B01J 21/00* (2006.01)
*B01J 20/00* (2006.01)

(52) U.S. Cl. .......................... 502/345; 502/60; 502/184; 502/244; 502/304; 502/346; 502/349; 502/350; 502/351; 502/355; 502/415; 502/439

(58) Field of Classification Search ................ 502/304, 502/345, 60, 184, 244, 346, 349, 350, 351, 502/355, 415, 439
See application file for complete search history.

(56) References Cited

U.S. PATENT DOCUMENTS

| | | |
|---|---|---|
| 3,272,759 A | 9/1966 | Stiles |
| 3,284,370 A | 11/1966 | Clifford et al. |
| 3,472,237 A | 10/1969 | Stephens |
| 3,819,535 A | 6/1974 | Huba et al. |

(Continued)

FOREIGN PATENT DOCUMENTS

| | | |
|---|---|---|
| GB | 127609 | 6/1919 |
| GB | 609166 | 9/1948 |

OTHER PUBLICATIONS

P. Bera et al., Ionic Dispersion of Pt & Pd on $CeO_2$ by Combustion Method: Effect of metal-Ceria Interaction on Catalytic Activities for NO Reduction & CO and Hydrocarbon Oxidation, Journal of Catalysis 2000, vol. 196, pp. 293 to 301, Academic Press, USA.

(Continued)

*Primary Examiner*—Cam N. Nguyen
(74) *Attorney, Agent, or Firm*—Buchanan Ingersoll & Rooney PC

(57) ABSTRACT

Nanocomposite copper-ceria catalysts are provided, which comprise copper oxide nanoparticles, copper nanoparticles, or a mixture thereof combined with ceria nanoparticles. Methods for making such catalysts are also provided, which involve the steps of (i) combining ceria nanoparticles in an aqueous suspension with copper 2,4-pentanedionate to form a slurry; (ii) heating the slurry formed in step (i) under an inert gas atmosphere or an oxygen-argon atmosphere, at a temperature and for a time sufficient to cause decomposition of the copper 2,4-pentanedionate to form copper nanoparticles and/or copper oxide nanoparticles that are combined with the ceria nanoparticles; and (iii) optionally, subjecting the product formed in step (ii) to a heat treatment process under conditions effective to convert at least some of the copper nanoparticles to copper oxide nanoparticles. The nanocomposite copper-ceria catalysts are useful for low-temperature and near-ambient temperature catalysis, such as the oxidation of carbon monoxide, the reduction of nitric oxide and the conversion of hydrocarbons. The nanocomposite copper-ceria catalysts have a variety of potential applications, for example, in vehicle exhaust emission systems of automobiles and diesel engines, cold starting of automobile engine, fuel cells, lasers, hydrocarbon conversion reactors, air filters for the conversion of carbon monoxide and/or indoor volatile organic compounds, and smoking articles.

25 Claims, 10 Drawing Sheets

U.S. PATENT DOCUMENTS

| | | | |
|---|---|---|---|
| 4,113,658 A | 9/1978 | Geus | |
| 4,252,687 A | 2/1981 | Dale et al. | |
| 4,256,609 A | 3/1981 | Dale et al. | |
| 4,317,460 A | 3/1982 | Dale et al. | |
| 4,426,319 A | 1/1984 | Blanchard et al. | |
| 4,450,245 A | 5/1984 | Adair et al. | |
| 4,639,432 A | 1/1987 | Holt et al. | |
| 4,711,773 A | 12/1987 | Mesters et al. | |
| 4,839,146 A | 6/1989 | Cho et al. | |
| 4,940,686 A | 7/1990 | Tooley et al. | |
| 4,943,550 A | 7/1990 | Kolts et al. | |
| 4,956,330 A | 9/1990 | Elliott et al. | |
| 4,968,656 A | 11/1990 | Fukuda et al. | |
| 4,994,247 A | 2/1991 | Tooley et al. | |
| 4,996,180 A | 2/1991 | Diwell et al. | |
| 5,017,357 A | 5/1991 | Kolts et al. | |
| 5,075,276 A | 12/1991 | Ozawa et al. | |
| 5,258,340 A | 11/1993 | Augustine et al. | |
| 5,499,636 A | 3/1996 | Baggett et al. | |
| 5,666,976 A | 9/1997 | Adams et al. | |
| 5,692,525 A | 12/1997 | Counts et al. | |
| 5,692,526 A | 12/1997 | Adams et al. | |
| 5,733,837 A | 3/1998 | Nakatsuji et al. | |
| 5,905,056 A | 5/1999 | Hartweg et al. | |
| 5,915,387 A | 6/1999 | Baggett, Jr. et al. | |
| 5,988,176 A | 11/1999 | Baggett, Jr. et al. | |
| 5,990,040 A | 11/1999 | Hu et al. | |
| 5,993,762 A | 11/1999 | Rajaram et al. | |
| 6,026,820 A | 2/2000 | Baggett et al. | |
| 6,209,547 B1 | 4/2001 | Koller et al. | |
| 6,306,795 B1 | 10/2001 | Ryan et al. | |
| 7,029,507 B2* | 4/2006 | Yadav et al. | 51/307 |
| 2002/0032349 A1 | 3/2002 | Baker et al. | |
| 2004/0007241 A1* | 1/2004 | Li et al. | 131/334 |
| 2004/0040566 A1* | 3/2004 | Li et al. | 131/364 |

OTHER PUBLICATIONS

T. Bueluesin et al., Studies of the Water-Gas-Shift Reaction on Ceria-Supported Pt, Pd, & Rh: Implications for Oxygen-Storage Properties, Applied Catalysis B. Environmental, 15, 1998, pp. 107-114, Elsevier Science B.V., Oxford, United Kingdom.

M. Flytzani-Stephanopoulos, Nanostructured Cerium Oxide "Ecocatalysts", MRS Bulletin, Nov. 2001, pp. 885-889.

Parthasarathi Bera et al., Studies on $Cu/CeO_2$: A New NO Reduction Catalyst, Journal of Catalysis 186, 1999, pp. 36-44, Academic Press, USA.

Fu, et al., Nanostructured $Au-CeO_2$ Catalysts for Low-temperature Water-Gas Shift, Catalysis Letters, vol. 77, No. 1-3, 2001, pp. 87-95, Plenum Publishing Corporation.

Yue Li et al., Low-Temperature Water-Gas Shift Reaction over Cu-and Ni-loaded Cerium Oxide Catalysts, Applied Catalysis B: Environmental 27 (2000), pp. 179-191, Elsevier Sci. B.V., Oxford, United Kingdom.

A.F. Diwell et al., The Role of Ceria in Three-Way Catlysts, Catalysis & Automotive Pollution Control II, 1991, pp. 139-152, Elsevier Sci. Publishers B.B., Amsterdam.

Bjorn Skarman et al., Carbon Monoxide Oxidation on Nanostructured $CuOx/CeO2$ Composite Particles Characterized by HREM, XPS, XAS, and High-Energy Diffraction, Journal of Catalysis, 2002, vol. 211, pp. 119-131, Elsevier Sciences, USA.

Kundakovic et al., Cu- and Ag-Modified Cerium Oxide Catalysts for Methane Oxidation, Journal of Catalysis, 1998, pp. 203-221, vol. 179, Academic Press, USA.

Tschope et al., Processing and Structural Evolution of Nanocrystalline $Cu-CeO_{2-a}$ Catalysts, Material Science and Engineering, 1995, pp. 267-271, vol. A204, Elsevier Science S.A.

Yue Li et al., Low-Temperature Water-Gas Shift Reaction over Cu- and Ni-loaded Cerium Oxide Catalysts, Applied Catalysis B. Environmental, 2000, pp. 179-191, vol. 27, Elsevier Science B.V., United Kingdom.

Wei Liu et al., Total Oxidation of Carbon Monoxide & Methane Over Transition metal-Fluorite Oxide Composite Catalysts, Journal of Catalysis, 1995, pp. 304-316, vol. 53, Academic Press, USA.

Wei Liu et al., Transition Metal-promoted Oxidation Catalysis By Fluorite Oxides: A Study of CO Oxidation over $Cu-CeO_2$, The Chemical Engineering Journal, 1996, pp. 283-294, vol. 64, Elsevier Science S.A.

Notification of Transmittal of the International Search Report or the Declaration for PCT/US03/27470 dated Aug. 17, 2004.

Bunluesin, T., "A Study of CO Oxidation Kinetics on Rh/Ceria", Department of Chemical Engineering, University of Pennsylvania, Philadelphia, Pennsylvania 19104, Academic Press, Inc., Journal of Catalysis 157, 222-226 (1995).

Notification of Transmittal of International Preliminary Examination Report dated Jan. 27, 2005 for PCT/US03/27470.

* cited by examiner

US 7,491,675 B2

NANOCOMPOSITE COPPER-CERIA CATALYSTS FOR LOW TEMPERATURE OR NEAR-AMBIENT TEMPERATURE CATALYSIS AND METHODS FOR MAKING SUCH CATALYSTS

This application is a divisional application of U.S. application Ser. No. 10/314,449 entitled NANOCOMPOSITE COPPER-CERIA CATALYSTS FOR LOW TEMPERATURE OR NEAR-AMBIENT TEMPERATURE CATALYSIS AND METHODS FOR MAKING SUCH CATALYSTS, filed on Dec. 9, 2002, now U.S. Pat. No. 6,857,431 the entire content of which is hereby incorporated by reference.

FIELD OF INVENTION

The invention relates generally to nanocomposite copper-ceria catalysts for low-temperature or near-ambient oxidation of carbon monoxide, reduction of nitric oxide and/or conversion of hydrocarbons. For example, the catalysts can be used to reduce the amount of certain constituents in tobacco smoke. More specifically, the invention relates to cut filler compositions, cigarette filters, smoking articles such as cigarettes, methods for making cigarettes and methods for smoking cigarettes, which involve the use of nanocomposite copper-ceria catalysts. Nanocomposite copper-ceria catalysts can also be used in a variety of other applications.

BACKGROUND

Cerium oxide (ceria) has been reported for certain catalysis applications. For example, it has been described as the key oxygen storage component in three way catalysts (TWC) used for the treatment of automotive exhausts. It has also been described as being useful for the removal of sulfur accumulated on catalysts in fluid catalytic cracking in oil refineries or as a regenerable sorbent for $H_2S$ in hot-coal gas cleanup system. See Flytzani-Stephanopoulos, M.; MRS Bulletin, pp. 885-889 (2001); Fu, Q., Weber, A. and Flytzani-Stephanopoulos, M., Catalysis Letters, 77(1-3): pp. 87-95 (2001); Li, Y., Fu, O., Flytzani-Stephanopoulos, M., Applied Catalysis B: Environmental, 27: pp. 179-191 (2000); Bera, P., Aruna, S. T., Patil, K. C. and Hegde, M. S., Journal of Catalysis, 186: pp. 36-44 (1999); Bunluesin, T., Cordatos, H. and Gorte, R. J., Journal of Catalysis, 157: pp. 222 (1995); Diwell, A. F., Rajaram, K. R., Shaw, H. A., and Truex, T. J., Stud. Surface Science Catalysis, 71:139 (1991); Bunluesin, T., Gorte, R. J., Graham, G. W., Applied Catalysis B: Environmental, 15: pp. 107 (1998), Kundakovic, L. and Flytzani-Stephanopoulos, M., Journal of Catalysis, 179: pp. 203-221 (1998), and Tschöpe, A., Ying, J. Y. and Chiang, Y. M., Materials Science and Engineering A, 204:267-271 (1995).

Certain catalysts containing ceria have been described in Skårman, B., et al., Journal of Catalysis, 211: pp. 119-133 (2002), and U.S. Pat. Nos. 5,993,762; 5,905,056; 5,733,837; 5,075,276; 4,996,180; 4,968,656; 4,839,146; 4,639,432; 3,819,535 and 3,284,370, as well as British Patent Nos. 609, 166 and 127,609 for example. The above reported catalysts containing ceria have been prepared using techniques such as co-precipitation (CP), deposition/precipitation (DP), co-precipitation-gelation technique using urea (UGC), impregnation, magnetron sputtering process and/or combustion synthesis. Such processes and precursors have various drawbacks and shortcomings. For instance, several of these techniques involve lengthy processes of between 20-30 hours for catalyst preparation, which can be expensive and inefficient. Further, some of these processes are not easily scaled up.

For example, in the CP method, ammonium carbonate or sodium carbonate is used as the precipitant. In a typical procedure, an aqueous solution of cerium (III) nitrate and other metal nitrates are combined in desired proportions with $(NH_4)_2CO_3$ at 60-70° C., at a constant pH value of 8. The precipitate is held at 60-70° C. for an hour, then filtered and washed with distilled water several times, followed by drying at 100-120° C. for 12 hours and calcining in air at several hundred degrees Celsius for 10 hours at a slow heating rate of 2° C./min. Sample preparation takes a total of about 22 hours. See Flytzani-Stephanopoulos, M.; MRS Bulletin, 885-889 (2001) and Liu, W., Flytzani-Stephanopoulos, M., The Chemical Engineering Journal, 64:283-294 (1996).

In the DP method, unlike the CP method, a catalyst support of doped or undoped ceria is independently prepared and calcined prior to use, and a desired amount of $HAuCl_4$ is added dropwise into an aqueous solution of the precalcined ceria at a pH of 8. The subsequent workup is similar to that of the CP method described above. The total preparation time is over 11 hours. See Fu, Q., Weber, A. and Flytzani-Stephanopoulos, M., Catalysis Letters, 77(1-3):87-95 (2001).

In a typical UGC method, $Cu-CeO_2$ nanoparticles are co-precipitated from nitrate salts of metals with urea at about 100° C. The precursor salts used are metal nitrates (copper nitrates and ceric ammonium nitrates) and the cerium salt used is $(NH_4)_2Ce(NO_3)_6$. The preparation procedure basically consists of mixing aqueous metal nitrates with urea $(H_2N-CO-NH_2)$, heating the solution to 100° C. under vigorous stirring with addition of deionized water, and boiling the resulting gel for 8 hours at 100° C. The product is then filtered and washed, followed by drying the residue in vacuum oven for 10-12 hours and calcining by slow heating in air for 4-6 hours. The total sample preparation time is about 28 hours. See Kundakovic, L. and Flytzani-Stephanopoulos, M., Journal of Catalysis, 179:203-221 (1998) and Li, Y., Fu, O., Flytzani-Stephanopoulos, M., Applied Catalysis B: Environmental, 27:179-191 (2000).

In a typical impregnation method, a $CeO_2$ or oxide support is first independently prepared by precipitation or any other method such as heating cerium acetate in air. Then the $CeO_2$ or metal oxide is mixed with a salt solution of copper and degassed under vacuum during impregnation. After excess solution is drained, the sample is dried for a few days at room temperature and then heated in air for four hours at 650° C. Liu, W., Flytzani-Stephanopoulos, M., Journal of Catalysis, 153:304-316 (1995).

In a typical magnetron sputtering process, nanocrystalline materials are generated in an ultra high vacuum chamber by magnetron sputtering from a mixed metal target of Cu—Ce in argon (30 Pa). The metal vapor is thermalized by the inert gas atmosphere and nucleated to form nanometer-sized clusters. The nanometer-sized clusters are collected on a liquid nitrogen cooled modified ground shield substance. After sputtering for 20 minutes, the ultra high vacuum chamber is evacuated and slowly back filled with oxygen to a final pressure of 1 kPa. The clusters are scraped and collected as loose powder, then calcined for 12 hours. See Tschöpe, A., Ying, J. Y. and Chiang, Y. M., Materials Science and Engineering A, 204: 267-271 (1995). The magnetron sputtering process involves a physical synthesis process using an ultra high vacuum sputtering system, which is very expensive in terms of capital costs and maintenance. The product yield may also be low, and difficult to scale up.

In a typical combustion synthesis, ceric ammonium nitrate and copper nitrate are used as precursors of cerium and copper. Oxalydihydrazide (ODH, $C_2H_6N_4O_2$) prepared from diethyl oxalate and hydrazine hydrate is used as fuel. The combustion synthesis process involves mixing copper and cerium precursor salt with water and ODH fuel, introducing the mixture in a preheated muffle furnace at 350° C., boiling, foaming and igniting the solution, which is said to produce the nanopowder in five minutes. The nano-powder thus produced is heated at 300° C. for 12 hours to drive moisture out and stored in vacuum desiccators. See Bera, P., Aruna, S. T., Patil, K. C. and Hegde, M. S., *Journal of Catalysis*, 186:36-44 (1999). Such combustion synthesis methods appear to be hazardous.

Catalysts for low-temperature oxidation are described in, for example, U.S. Pat. Nos. 5,258,340; 5,017,357; 4,994,247; 4,956,330; 4,943,550; 4,940,686; 4,450,245; 4,426,319; 4,317,460; 4,256,609 and 4,252,687. However, these patents do not appear to describe nanocomposite copper-ceria catalyst.

Despite the developments to date, there is interest in low-temperature catalysts and methods for making such catalysts. Preferably, such methods could be used to produce large quantities of catalyst in relatively short periods of time and under non-hazardous conditions.

SUMMARY

The invention relates generally to nanocomposite copper-ceria catalysts, as well as to methods for making nanocomposite copper-ceria catalysts and their use in a variety of applications. In particular, the nanocomposite copper-ceria catalysts are useful for low-temperature or near-ambient oxidation of carbon monoxide.

In an embodiment, the invention relates to a method for making a nanocomposite copper-ceria catalyst, which comprise (i) combining ceria nanoparticles, in an aqueous suspension with copper 2,4-pentanedionate to form a slurry. The ceria nanoparticles of step (i) may be provided in the form of cerium-oxide (ceria) nanoparticles or alternatively, in the form of a precursor that is converted into ceria nanoparticles. For example, a cerium 2,4-pentanedionate precursor can be used in step (i) as a source of ceria nanoparticles.

Next, the slurry formed in step (i) is heated under an inert gas atmosphere or an oxygen-argon atmosphere, at a temperature and for a time sufficient to cause decomposition of the copper 2,4-pentanedionate to form copper nanoparticles and/or copper oxide nanoparticles are combined with the ceria nanoparticles. Preferably, step (ii) is carried out under an inert gas atmosphere such as argon and/or nitrogen. Step (ii) may alternatively be carried out under an oxygen-argon atmosphere, such as a mixture of at least about 1% by volume oxygen in argon, preferably at least about 2% by volume oxygen in argon.

Optionally, the product formed in step (ii) is subjected to a heat treatment process under conditions effective to convert at least some of the copper nanoparticles to copper oxide nanoparticles.

In an embodiment of the invention, the heat treatment in step (iii) is not optional, and is carried out by heating the product from step (ii) in open air at a temperature of about 300° C. to about 400° C. for a time sufficient to convert at least some of the copper nanoparticles to copper oxide nanoparticles.

In another embodiment, the heat treatment in step (iii) is not optional and is carried out by heating the product from step, (ii) in an oxygen-argon gas mixture at a temperature of about 300° C. to about 400° C. for a time sufficient to convert at least some of the copper nanoparticles to copper oxide nanoparticles. Preferably, the oxygen-argon gas mixture may comprise from about 1% by volume to about 10% by volume oxygen gas.

In yet another embodiment, the heat treatment in step (iii) is not optional, and is carried out by heating the product from step (ii) in a carbon monoxide-oxygen-argon gas mixture in a tube reactor, where the tube reactor is initially at ambient temperature and heated at a rate of about 10° C. per minute until a final temperature of about 250° C. is achieved. Preferably, the carbon monoxide-oxygen-argon gas mixture comprises from about 1% by volume to about 10% by volume carbon monoxide and 10% by volume to about 30% oxygen gas.

In a preferred embodiment, at least several grams of the nanocomposite copper-ceria catalyst can be prepared (i.e. steps (i), (ii) and (iii) described above are completed) in about 2 to about 5 hours.

The nanocomposite copper-ceria catalyst thus produced comprises copper oxide nanoparticles, copper nanoparticles, or a mixture thereof combined with ceria nanoparticles. The invention thus also relates to a nanocomposite copper-ceria catalyst produced by this process, as well as nanocomposite copper-ceria catalysts for low temperature or near-ambient temperature oxidation. Preferably, the nanocomposite copper-ceria catalyst is capable of catalyzing oxidation reactions, reduction reactions, and/or hydrocarbon conversion reactions. In particular, the nanocomposite copper-ceria catalyst is capable of catalyzing the oxidation of carbon monoxide to carbon dioxide and/or the reduction of nitric oxide to nitrogen. Preferably, the nanocomposite copper-ceria catalyst is capable of catalyzing reactions at temperatures below about 200° C., such as below about 100° C. or below about 30° C.

Preferably, the nanocomposite copper-ceria catalyst comprises from about 0.4% by weight to about 70% by weight of copper oxide and/or copper, or preferably from about 1% by weight to about 20% by weight of copper oxide and/or copper. In an embodiment, the nanocomposite copper-ceria catalyst has a surface area from about 50 $m^2$/gram to about 250 $m^2$/gram, or preferably from about 100 $m^2$/gram to about 200 $m^2$/gram. In an embodiment, the nanocomposite copper-ceria catalyst is less than about 500 nm in size, preferably less than about 100 nm in size, more preferably less than about 10 nm in size, and most preferably less than about 5 nm in size.

The nanocomposite copper-ceria catalyst may be carried by a catalyst support. Examples of catalyst supports include, for example, ceramics, organic polymers, inorganic polymers, zeolites, glasses, metals, carbons, and mixtures thereof. The catalyst support can be nanosized, micron sized or a monolith such as a honeycomb. The nanocomposite can be deposited on the catalyst support or mixed with catalyst support particles. Examples of the catalyst support include aluminum, alumina, titanium, titania, zircohia, magnesia, silica, silica gel, activated carbon, carbon fibers, carbon foam, and/or mixtures thereof.

Such catalysts may be used in a variety of applications. For example, the catalyst may be incorporated into a hydrocarbon conversion reactor in an amount effective to convert hydrocarbons. The catalyst may be incorporated into a vehicle exhaust emissions system in an amount effective to oxidize carbon monoxide to carbon dioxide. The catalyst may also be used for emissions reduction in the cold starting of an automobile engine in an amount effective to oxidize carbon monoxide to carbon dioxide. In another embodiment, the catalyst may be incorporated into a laser in an amount effective to oxidize carbon monoxide to carbon dioxide. In another embodiment, the catalyst can be incorporated into a fuel cell in an amount effective to oxidize carbon monoxide to carbon dioxide. In yet another embodiment, the catalyst can be used in an air filter for the conversion of carbon monoxide and/or indoor volatile organic compounds.

In an embodiment, cut filler compositions comprising tobacco and a nanocomposite copper-ceria catalyst are provided, wherein the nanocomposite copper-ceria catalyst comprises copper oxide nanoparticles, copper nanoparticles, or a mixture thereof combined with ceria nanoparticles, and further wherein the nanocomposite copper-ceria catalyst is capable of reducing the amount of at least one constituent in tobacco smoke. Preferably, the at least one constituent in tobacco smoke is selected from the group consisting of carbon monoxide, nitric oxide, hydrocarbons, and mixtures thereof.

In an embodiment, the invention also relates to smoking articles comprising a nanocomposite copper-ceria catalyst, wherein the nanocomposite copper-ceria catalyst comprises copper oxide nanoparticles, copper nanoparticles, or a mixture thereof combined with ceria nanoparticles, and further wherein the nanocomposite copper-ceria catalyst is capable of reducing the amount of at least one constituent in tobacco smoke. Preferably, the at least one constituent in tobacco smoke is selected from the group consisting of carbon monoxide, nitric oxide, hydrocarbons, and mixtures thereof.

Preferably, the nanocomposite copper-ceria catalyst is present in an amount effective to convert at least 30% of carbon monoxide in mainstream tobacco smoke, to convert at least 30% of nitric oxide in mainstream tobacco smoke and/or convert at least 30% of hydrocarbons in mainstream tobacco smoke. Typical smoking articles will comprise from about 5 mg to about 200 mg of the nanocomposite copper-ceria catalyst, and preferably greater than about 50 mg of the nanocomposite copper-ceria catalyst. Examples of a smoking article include, for example, cigarette, pipe, cigar and non-traditional cigarette. In such smoking articles the nanocomposite copper-ceria catalyst can be dispersed in a cut filler, located in a cigarette paper, and/or located in a filter. If the nanocomposite copper-ceria catalyst is located in a filter, the filter may be a mono filter, a dual filter, a triple filter, a cavity filter, a recessed filter or a free-flow filter. The nanocomposite copper-ceria catalyst is incorporated into one or more filter parts selected from the group consisting of: shaped paper insert, a plug, a space between plugs, cigarette filter paper, plug wrap, a cellulose acetate sleeve, a polypropylene sleeve, and a free-flow sleeve.

The invention also relates to methods for making a smoking article comprising incorporating a nanocomposite copper-ceria catalyst into a smoking article, wherein the nanocomposite copper-ceria catalyst is made by a process comprising (i) combining ceria nanoparticles in an aqueous suspension with copper 2,4-pentanedionate to form a slurry; (ii) heating the slurry formed in step (i) under an inert gas atmosphere or an oxygen-argon atmosphere, at a temperature and for a time sufficient to cause decomposition of the copper 2,4-pentanedionate to form copper nanoparticles and/or copper oxide nanoparticles that are combined with the ceria nanoparticles; and (iii) optionally, subjecting the product formed in step (ii) to a heat treatment process under conditions effective to convert at least some of the copper nanoparticles to copper oxide nanoparticles; wherein the nanocomposite copper-ceria catalyst produced comprises copper oxide nanoparticles, copper nanoparticles, or a mixture thereof combined with ceria nanoparticles.

In another embodiment, the invention relates to methods for making a cigarette, comprising (i) providing a cut filler comprising a nanocomposite copper-ceria catalyst to a cigarette making machine to form a tobacco rod; and (ii) placing a paper wrapper around the tobacco rod to form the cigarette, wherein the nanocomposite copper-ceria catalyst is capable of reducing the amount of at least one constituent in tobacco smoke.

The invention also relates to methods of making a cigarette, which comprise (i) providing a cut filler to a cigarette making machine to form a tobacco rod; (ii) placing a paper wrapper around the tobacco rod; and (iii) attaching a cigarette filter to the tobacco rod using tipping paper to form the cigarette, wherein the cigarette filter comprises a nanocomposite copper-ceria catalyst capable of reducing the amount of at least one constituent in tobacco smoke.

In yet another embodiment, the invention relates to methods for making a cigarette, comprising (i) providing a cut filler to a cigarette making machine to form a tobacco rod; and (ii) placing a paper wrapper around the tobacco rod to form the cigarette, wherein the paper wrapper comprises a nanocomposite copper-ceria catalyst that is capable of reducing the amount of at least one constituent in tobacco smoke.

In another embodiment, the invention provides methods for making a cigarette filter, comprising incorporating a nanocomposite copper-ceria catalyst into a cigarette filter, wherein the nanocomposite copper-ceria catalyst is capable of reducing the amount of at least one constituent in tobacco smoke.

In an embodiment, the invention relates to methods of smoking a cigarette containing the nanocomposite copper-ceria catalyst, which comprises lighting the cigarette to form smoke and drawing the smoke through the cigarette, wherein during the smoking of the cigarette, the nanocomposite copper-ceria catalyst reduces the amount of at least one constituent from tobacco smoke.

BRIEF DESCRIPTION OF THE DRAWINGS

As shown in FIG. 3B, the first and second light-off temperatures are 30° C. and 110° C. respectively and 63% conversion was achieved without any aid of furnace heating.

DETAILED DESCRIPTION OF PREFERRED EMBODIMENTS OF THE INVENTION

Figure 1:
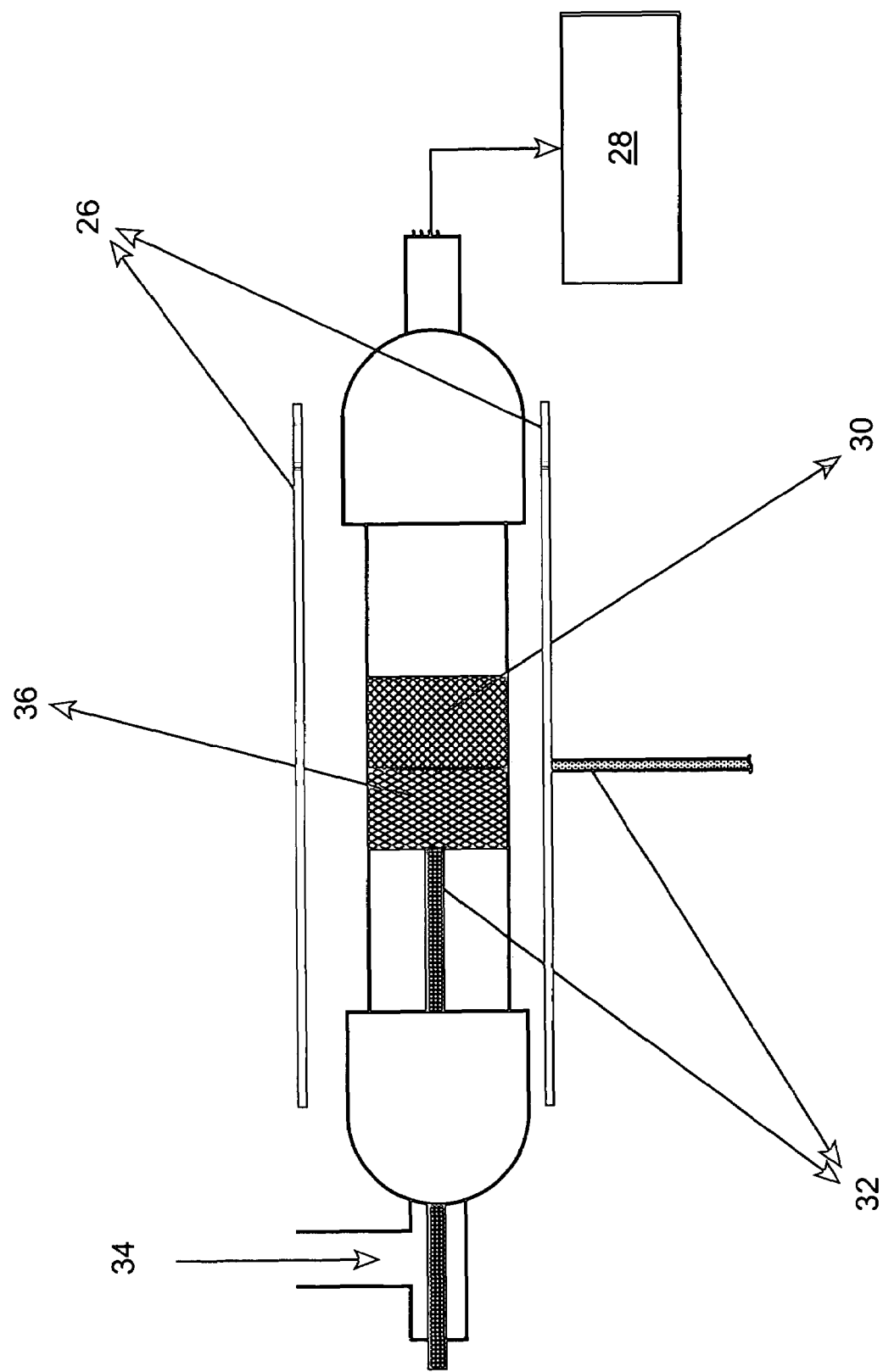
FIG. 1 depicts a schematic diagram of the experimental set-up to test catalysts in a laboratory flow tube reactor under a continuous flow of a CO gas mixture.

The invention relates generally to nanocomposite copper-ceria catalysts, which are particularly useful for low-temperature or near-ambient oxidation of carbon monoxide, the reduction of nitric oxide and/or conversion of hydrocarbons. By "low-temperature" is meant temperatures below about 200° C. By "near-ambient" is meant temperatures from about 20° C. to about 30° C. Specifically, the nanocomposite copper-ceria catalysts have a variety of potential applications, for example, in smoking articles, vehicle exhaust emission systems of automobiles and diesel engines, cold starting of automobile engine, fuel cells, lasers, hydrocarbon conversion reactors, air filters for the conversion of carbon monoxide and/or indoor volatile organic compounds, and smoking articles. In preferred embodiments, the invention provides cut filler compositions, smoking articles such as cigarettes, cigarette filters, methods for-making cigarettes and methods for smoking cigarettes, which involve the use of nanocomposite copper-ceria catalysts.

The nanocomposite copper-ceria catalysts (also referred to herein as Cu—$CeO_2$ nanocomposite catalysts) are composites of copper and ceria (cerium oxide) nanoparticles, where copper nanoparticles are combined with the ceria nanoparticles. The copper may be present in the form of copper, or in the form of copper oxides such as cupric oxide (CuO), cuprous oxide ($Cu_2O$) and mixtures thereof.

As mentioned above, the nanocomposite copper-ceria catalysts are useful for catalyzing reactions at low or ambient temperatures. By "catalyzing" is meant that the nanocomposite copper-ceria catalysts affect the rate of a chemical reaction without themselves being consumed or undergoing a chemical change in the overall reaction. The nanocomposite copper-ceria catalysts can catalyze oxidation, reduction or conversion reactions, e.g. such as the oxidation of carbon monoxide, reduction of nitric oxide and/or conversion of hydrocarbons, for example. In a preferred embodiment, the nanocomposite copper-ceria catalysts are used for the oxidation of carbon monoxide to carbon dioxide.

According to a preferred embodiment, the nanocomposite copper-ceria catalysts are prepared through a chemical synthesis method, which comprises combining ceria nanoparticles in a proportionate amount with copper 2,4-pentanedionate in an aqueous suspension to form a slurry. The ceria nanoparticles are commercially available, for example, from Alfa Aesar, Ward Hill, Mass. The ceria nanoparticles may be purchased in the form of an aqueous suspension, or alternatively, a water-based solution or suspension can be prepared by mixing ceria nanoparticles with water prior to use. Alternatively, the ceria nanoparticles may be provided in the form of a precursor, such as cerium 2,4-pentanedionate, which provides the ceria nanoparticles. The mixture is preferably stirred vigorously, such as with a magnetic stirrer for a time sufficient to ensure complete mixing of the copper 2,4-pentanedionate precursor powder with the aqueous suspension of the ceria nanoparticles or mixture of cerium precursor.

The slurry thus formed is heated at a temperature and for a time sufficient to cause decomposition of the copper 2,4-pentanedionate to form copper nanoparticles, wherein the copper nanoparticles are combined with the ceria nanoparticles. The copper nanoparticles may also be in the form of copper oxide, i.e. cupric oxide (CuO), cuprous oxide ($Cu_2O$) and mixtures thereof. Step (ii) can be carried out using any suitable temperature, pressure and/or atmosphere conditions. For instance, the slurry formed can be heated to approximately 375° C. in a furnace at a total pressure of 820 torr for about 45 minutes. The heating is typically carried out in either an inert atmosphere, such as pure argon or in a gas atmosphere of oxygen in argon, such as a mixture of at least about 1% by volume oxygen in argon, preferably at least about 2% by volume oxygen in argon.

In one embodiment of the invention, a product formed using a heating step that is carried out under an inert atmosphere is subjected to a subsequent heat treatment. Such treatment will cause the formation of copper oxide nanoparticles, i.e. cupric oxide (CuO), cuprous oxide ($Cu_2O$) and mixtures thereof. If step (ii) was carried out under an inert atmosphere, step (iii) may advantageously be used to convert at least some of the copper nanoparticles to copper oxide nanoparticles. If step (ii) was carried out in an oxygen-containing atmosphere, cupric oxide (CuO), cuprous oxide ($Cu_2O$) and mixtures thereof may have also been formed in step (ii) previously.

Any suitable heat treatment can be used, and in particular the following heat treatment processes (A), (B) and (C) were-studied. In heat treatment (A), the product was spread in a ceramic boat and inserted in a tube furnace. The product was then heated in air at temperatures around 380±10° C. for one hour. After cooling, the sample was taken out and tested for catalytic activity.

In heat treatment (B), about 100 mg of the product was sprinkled on a quartz wool swab and heated in a tube reactor as shown in FIG. 1 at 380±10° C. using a 20% by volume $O_2$-argon gas mixture for an hour. The sample was then cooled, removed from the furnace, and tested for catalytic activity.

In heat treatment (C), about 100 mg of the product was sprinkled on a quartz wool swab and heated in a tube reactor as shown in FIG. 1 at a rate of 10° C./min up to a temperature of 250° C. using an argon gas mixture comprising 4% by volume CO and 21% by volume $O_2$. The sample was then cooled by flowing air in the gap between the tube furnace and the tube reactor, while keeping the tube reactor closed and turning off the CO gas mixture flow. After the temperature of both the furnace as well as the sample was close to ambient temperature, i.e. around 28° C., the sample was tested for catalytic activity.

The catalysts can be tested for their catalytic ability using any suitable method. For example, the catalysts produced according to the methods described above were tested to determine effectiveness in oxidation of carbon monoxide, reduction of nitric oxide and conversion of hydrocarbons. In typical tests to determine the ability of the catalyst to catalyze the oxidation of carbon monoxide, a sample of the nanocomposite copper-ceria catalyst was tested in a laboratory flow tube reactor under a continuous flow of a CO gas mixture. A schematic diagram of the experimental set-up for the flow tube reactor is shown in FIG. 1. The test method involved (a) placing about 100 mg of catalyst powder on a small quartz wool swab 36, (b) inserting the quartz wool swab in the tapered region (5 mm diameter) of a 20 mm diameter quartz tube kept in a tube furnace 26, in front of a quartz wool plug 30 (c) flowing an argon gas mixture 34, which comprises 3 to 4% by volume CO and 21% by volume $O_2$, through the quartz tube at a rate of 1 L/min, (d) turning the furnace on, and heating at a rate of 1° C./min to 25° C./min and, (e) recording the conversion of CO to $CO_2$ at different temperatures by using a NGA 2000 Fisher-Rosemount MLT-4 multichannel analyzer 28. A type K thermocouple 32 was inserted in the quartz wool 36 to measure the sample temperature. The catalytic activities were compared based on two light-off temperatures, i.e. a "first light-off temperature" where rapid conversion of CO to $CO_2$ starts, and the "second light-off temperature" where 50% conversion of CO is achieved.

In some cases this test for catalytic activity was repeated once or twice right after the first test, and the procedure for repeat tests was as follows: after the completion of the first test in CO, both the furnace and the CO gas flow were turned off, and cooled to about room temperature, while keeping the tube reactor closed. Then the sample was reheated in a flowing CO gas mixture, as previously described, and CO to $CO_2$ conversion was recorded. The subsequent tests are referred to herein as the "2nd" and "3rd" tests. Unless specifically indicated all results of the test for catalytic activity are for the "1st" test.

Figure 2A:
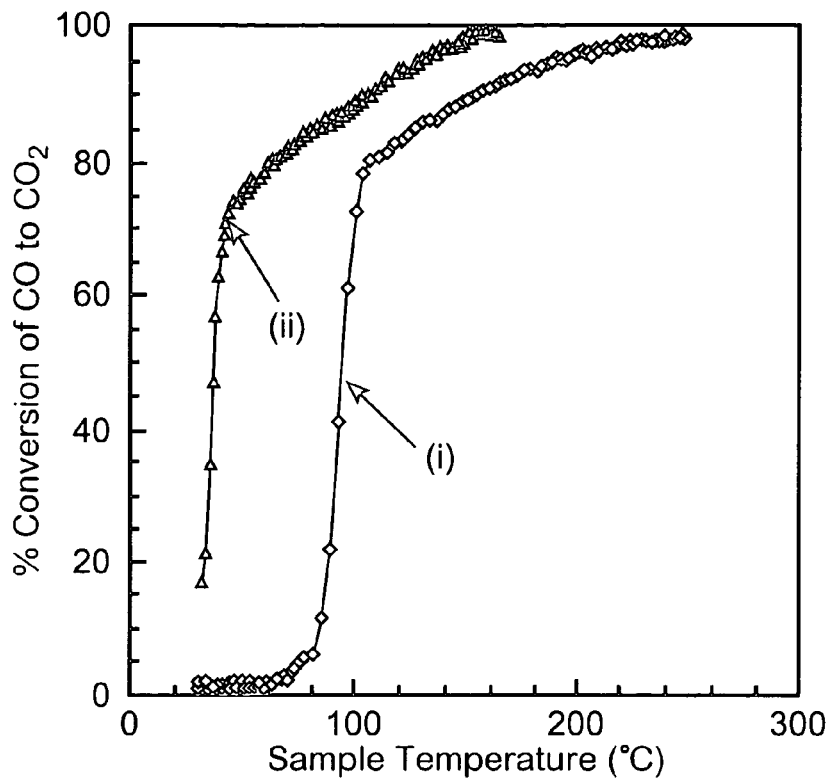
FIG. 2A shows the variation of percentage conversion of CO to $CO_2$ with sample temperature for a 5.5 wt % Cu—$CeO_2$ nanocomposite catalyst prepared in pure argon. Curve (i) represents a 1st test, and curve (ii) represents a 2nd test.
Figure 2B:
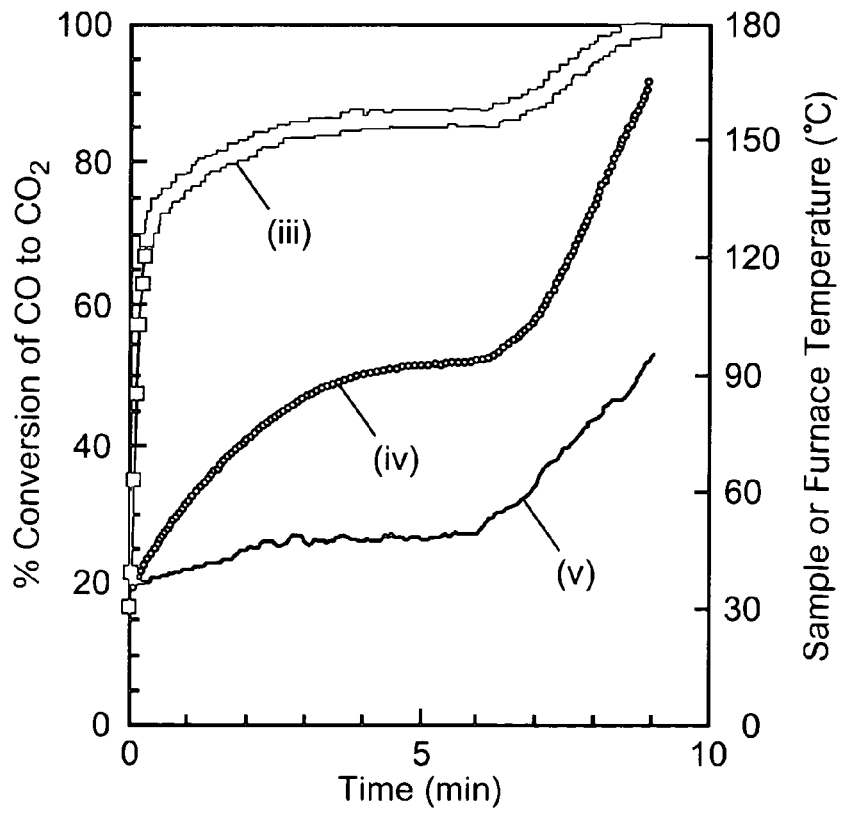
FIG. 2B shows the percent conversion of CO to $CO_2$ with respect to time in curve (iii), sample temperature in curve (iv) and the furnace temperature in curve (v) for the 2nd test from FIG. 2A.

FIG. 2A shows the variation of percentage conversion of CO to $CO_2$ with sample temperature for a nanocomposite copper-ceria catalyst containing 5.5 wt. % Cu that was made in pure Ar gas atmosphere, then heat treated in a tube furnace in open air at temperatures around 380±10° C. for one hour (heat treatment "A"). During the 1st test, shown in curve (i), the first and second light-off temperatures were 75° C. and 87° C., respectively. During the 2nd test, shown in curve (ii), the corresponding light-off temperatures were 32° C. and 40° C., respectively. Test results of the 2nd test have been replotted in FIG. 2B, to show the percent conversion of CO to $CO_2$ in curve (iii), sample temperature in curve (iv) and the furnace temperature in curve (v) over time. As shown in FIG. 2B, 80% conversion was achieved within 1 minute without any external heating (furnace was off) and sample temperature reached 60° C. due to the exothermic nature of the chemical reaction.

Figure 3A:
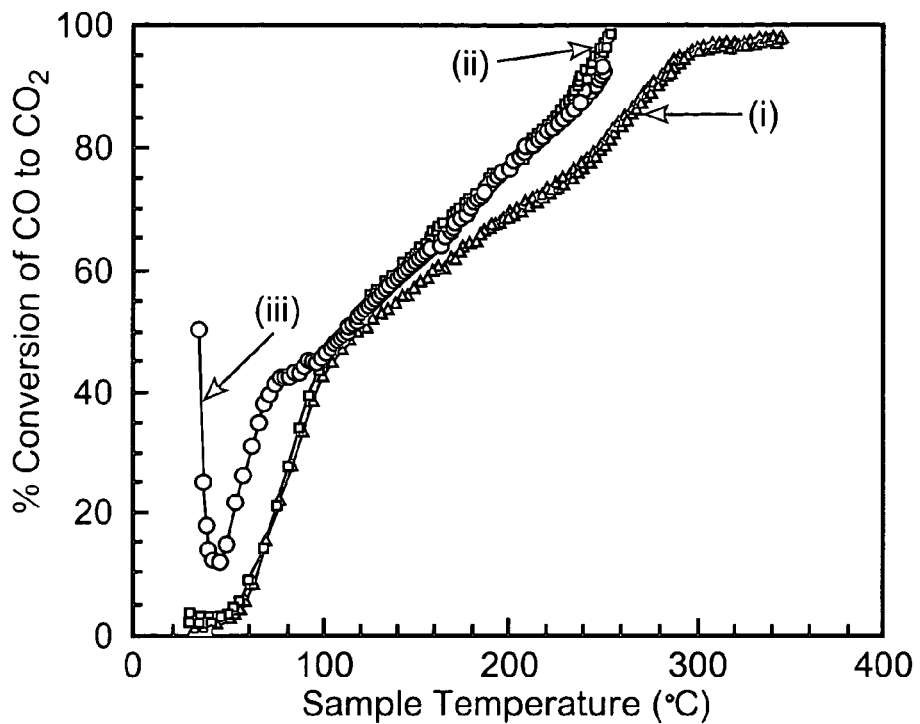
FIG. 3A shows a catalytic test result for a 18% Cu—$CeO_2$ nanocomposite catalyst that was made in a 2% by volume $O_2$-argon gas mixture. Curves (i), (ii) and (iii) show the results of a 1st, 2nd and 3rd test respectively.
Figure 3B:
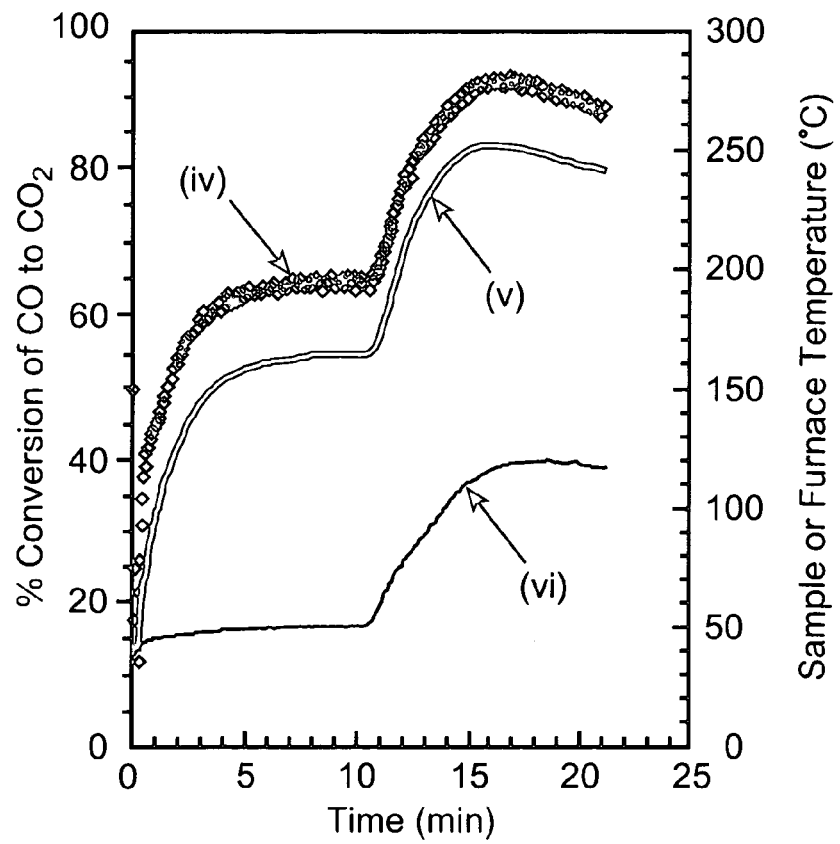
FIG. 3B shows the percent conversion of CO to $CO_2$ in curve (iv), sample temperature in curve (v) and the furnace temperature in curve (vi) over time for the 3rd test from FIG. 3A.

FIG. 3A shows the catalytic test result using a nanocomposite copper-ceria catalyst containing 18 wt. % Cu prepared in a 2% by volume $O_2$-argon gas mixture. Curves (i), (ii) and (iii) show the results of a 1st, 2nd and 3rd test respectively. FIG. 3B shows the percent conversion of CO to $CO_2$ in curve (iv), sample temperature in curve (v) and the furnace temperature in curve (vi) over time for the 3rd test from FIG. 3A. FIG. 3B shows the "3rd" test result where the first and second light-off temperatures were 30° C. and 110° C., respectively. Although the furnace was kept off during the first 10 minutes of the test, as shown in FIG. 3B, 62% conversion was achieved in four minutes without any aid of external heating.

Figure 4:
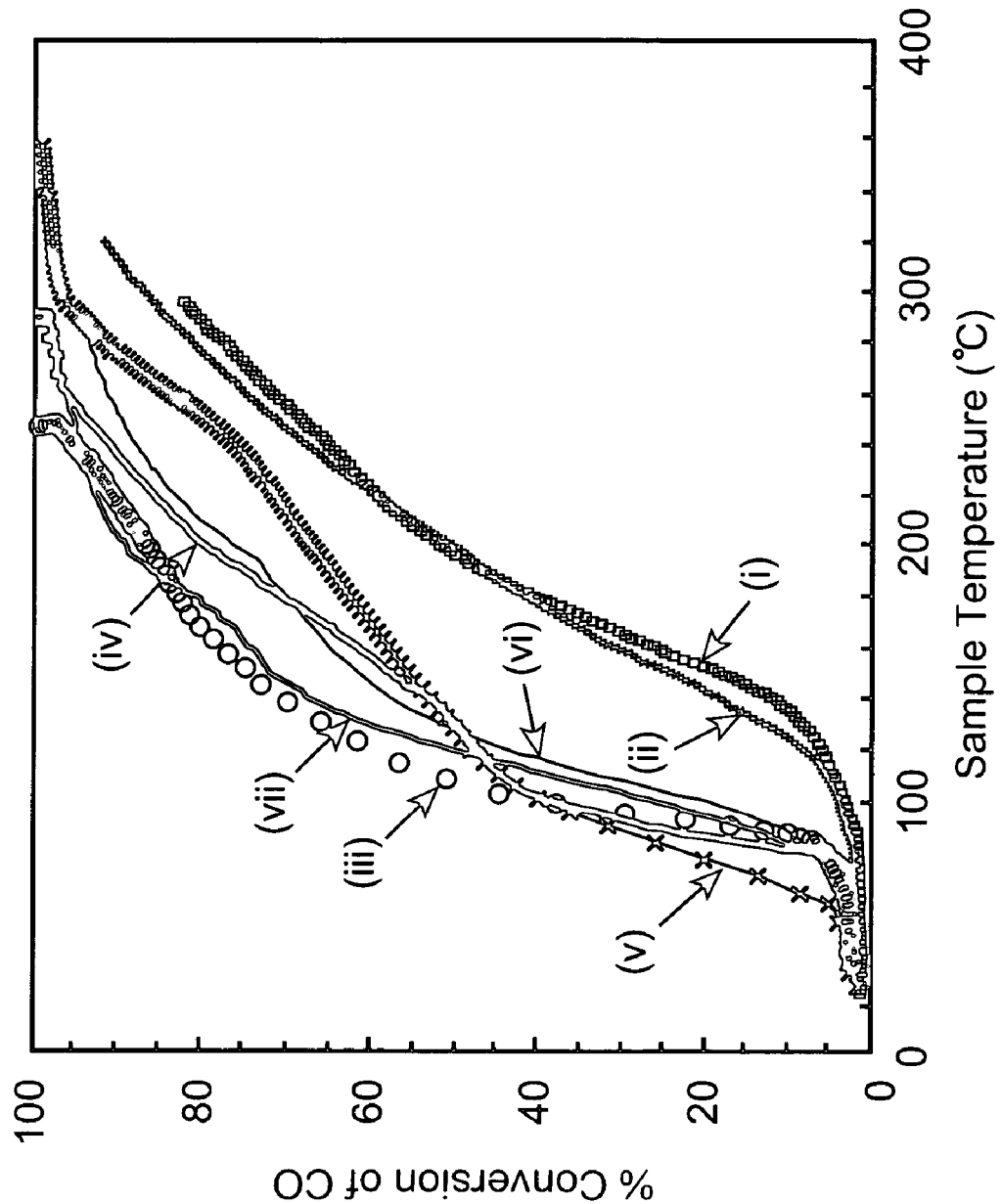
FIG. 4 depicts test results with as prepared Cu—$CeO_2$ nanocomposite catalysts prepared under a 2% by volume oxygen-argon atmosphere and containing about 0.4% by weight Cu in curve (i), about 2% by weight Cu in curve (ii), about 5.5% by weight Cu in curve (iii), about 10% by weight Cu in curve (iv), about 18% by weight Cu in curve (v), about 27% by weight Cu in curve (vi), and about 35.5% by weight Cu in curve (vii).

FIG. 4 compares test results with nanocomposite copper-ceria catalysts prepared under a 2% by volume oxygen-argon atmosphere and containing about 0.4% by weight Cu in curve (i), about 2% by weight Cu in curve (ii), about 5.5% by weight Cu in curve (iii), about 10% by weight Cu in curve (iv), about 18% by weight Cu in curve (v), about 27% by weight Cu in curve (vi), and about 35.5% by weight Cu in curve (vii).

Figure 5:
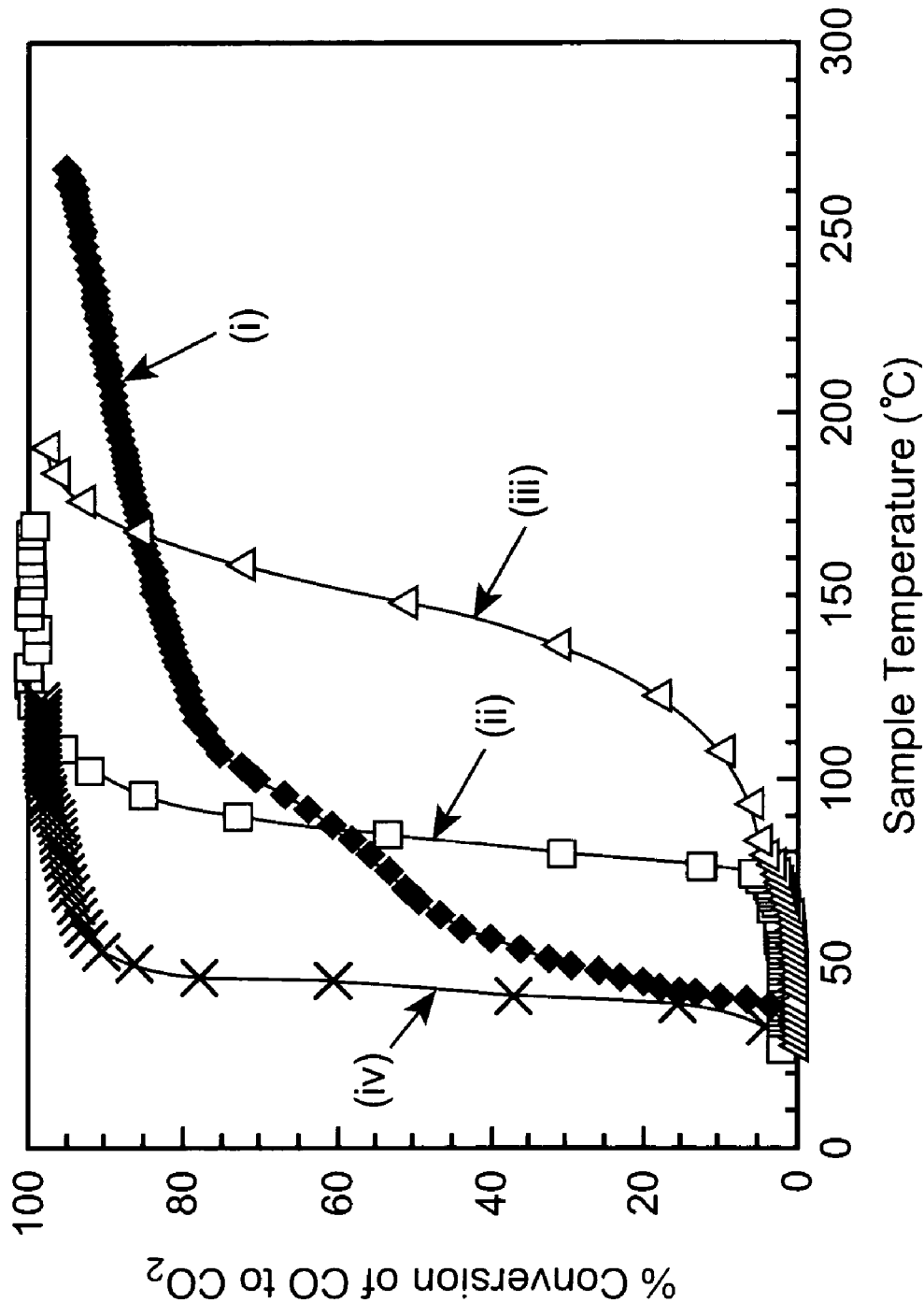
FIG. 5 depicts the effect of different types of heat treatments on the catalytic performance of 10% wt. Cu—$CeO_2$ nanocomposite catalysts prepared in pure argon. A catalyst subjected to heat treatment B is shown in curve (i), a catalyst subjected to heat treatment A is shown in curve (ii), a catalyst without any heat treatment is shown in curve (iii), and a catalyst subjected to heat treatments A as well as C is shown in curve (iv). The catalyst that was subjected to heat treatments A as well as C worked at near-ambient temperatures,. showing first and second light-off temperatures of 28° C. and 40° C., respectively.

FIG. 5 shows the effects of different types of heat treatment on the catalytic performance of nanocomposite copper-ceria catalysts containing 10% by weight Cu. Catalysts were prepared under pure argon gas, and then subjected to a subsequent heat treatment. Catalysts which were subjected to heat treatment "B," "A" and "A+C" are shown in curve (i), (ii), and (iv) respectively. Curve (iii) represents the catalyst without any heat treatment. The figure compares the catalytic performance of the nanocomposite copper-ceria catalysts, which are subjected to a heat treatment of either process A, B or A and C together. The second light-off temperatures for 50% conversion were 84° C., 67° C. and 40° C. respectively for heat treatment (A), (B), and (A and C). As shown in the figure, the catalyst that was subjected to heat treatment A and C worked at near-ambient temperatures, showing a first and second light-off temperature of 28° C. and 40° C., respectively. In the case of heat treatment A and C together, 90% conversion was achieved at 53° C. without any external heating. Complete conversion (100%) was achieved without any aid of furnace heating.

Figure 6:
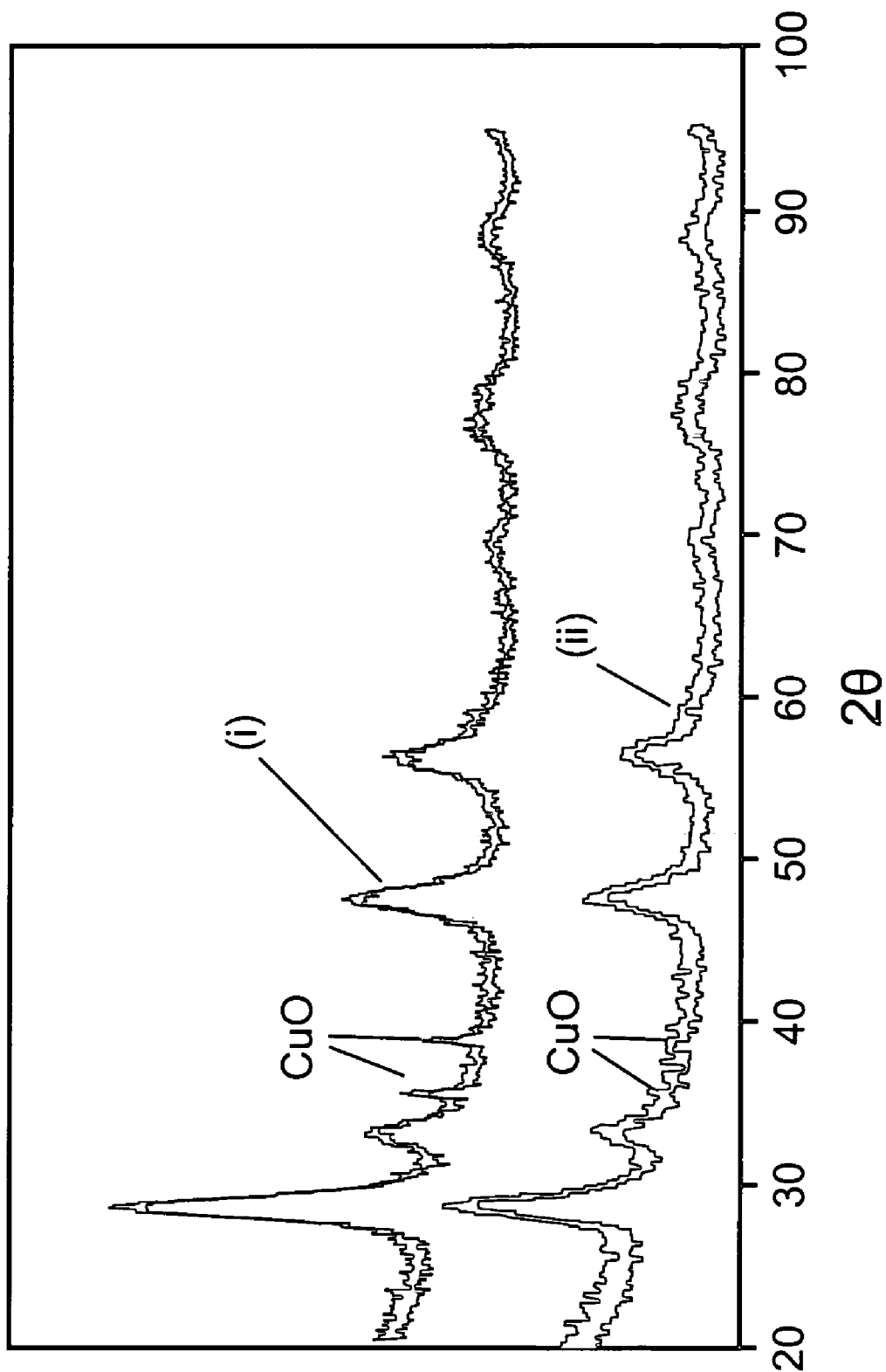
FIG. 6 depicts the characterization of a nanocomposite copper-ceria catalyst containing about 18% by weight Cu by the X-ray diffraction method. Curve (i) shows the nanocomposite copper-ceria catalyst prepared in pure argon, then heat treated by process A, and curve (ii) shows the nanocomposite copper-ceria catalyst prepared in a 2% by volume oxygen-argon gas mixture without any subsequent heat treatment.

FIG. 6 shows the characterization of a nanocomposite copper-ceria catalyst containing 18% by weight Cu by the X-ray diffraction method. Curve (i) shows the nanocomposite copper-ceria catalyst prepared in pure argon then subjected to heat treatment A, and curve (ii) shows the nanocomposite copper-ceria catalyst prepared in a 2% by volume oxygen-argon gas mixture without any subsequent heat treatment. When the catalysts were prepared in pure Ar and then heat treated in air as in heat treatment (A) for curve (i), the diffraction peaks of $CeO_2$ and CuO are observed in curve (ii). When the nanocomposite copper-ceria catalyst was prepared in a 2% by volume $O_2$—Ar gas mixture diffraction peaks of $CeO_2$ and CuO were observed in curve (ii), but the intensity of the CuO peaks was lower.

Figure 7:
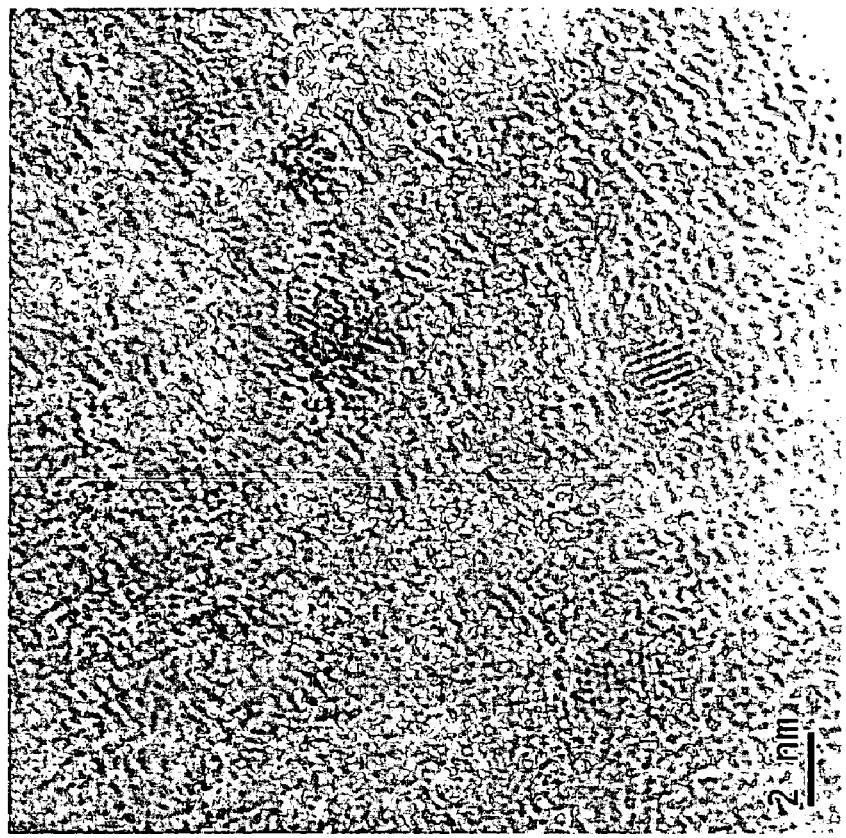
FIG. 7 depicts the Cu—$CeO_2$ nanocomposite catalyst as observed in TEM.
Figure 7:
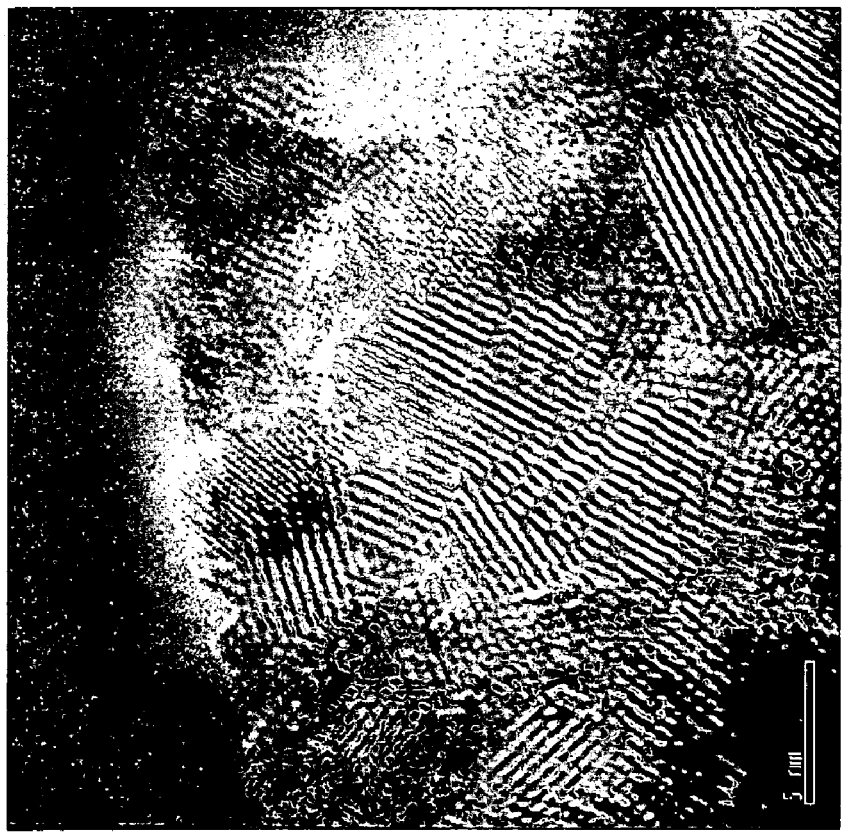

FIG. 7 shows the nanoparticles of Cu—$CeO_2$ as observed in TEM. Individual particles of size range 2-3 nm as well as large agglomerated particles containing 5 nm sized grains are observed. Average BET surface area is 100 $m^2/g$. Based on lattice parameter calculation $CeO_2$, $Cu_2O$ and CuO phases were identified.

It should be noted that in the above method for making the nanocomposite copper-ceria catalyst, the method may further comprise the step of depositing the nanocomposite copper-ceria catalyst on a catalyst support. In a preferred embodiment, the nanocomposite copper-ceria catalyst may be used with a catalyst support and/or in combination with one or more other catalysts. The support can be formed from conventional materials commonly used when forming a supported catalyst, such as ceramics, organic and inorganic polymers, glasses, metals, carbons, etc. In particular, porous or nonporous catalyst supports such as aluminum, alumina, titanium, titania, silica, silica gel, activated carbon and others may be used. In a preferred embodiment, a catalyst support comprising the nanocomposite copper-ceria catalyst reduces the amount of heat generated through the catalytic reaction. The catalyst support can be in the form of nanosized or micron sized particles or in the form of a monolith such as a honeycomb. The nanocomposite copper-ceria catalyst can be deposited on the support catalyst or combined with catalyst support particles.

The catalyst composition herein is expressed as weight percent (% wt.) Cu and has been calculated as [(wt of Cu/wt of Cu+wt of $CeO_2$)×100]. Preferably, the nanocomposite copper-ceria catalyst comprises from about 0.4% by weight to about 70% by weight of copper wherein the copper is in the form of copper oxide nanoparticles and/or copper nanoparticles, preferably from about 1% by weight to about 20% by weight of copper wherein the copper is in the form of copper oxide nanoparticles and/or copper nanoparticles.

The above process uses a new chemical synthesis process, which involves the use of a copper precursor and ceria or ceria precursor that have not been tried earlier and yields a novel nanocomposite copper-ceria catalyst which may be used for low-temperature oxidation reactions at temperatures below 50° C. or 40° C., or near-ambient temperatures, which is much lower than other ceria-based catalysts.

Moreover, this process also offers several advantages compared to traditional techniques such as simple co-precipitation(CP), co-precipitation-gelation technique using urea (UGC), deposition/precipitation (DP), impregnation, magnetron sputtering process, and/or combustion synthesis. For example, several hundred milligrams of the nanocomposite copper-ceria catalyst can be prepared economically and efficiently using this process in less than 5 hours total, e.g. preferably about 2.5 hours total. As part of the process, the heat treatment can be performed in a short time period, such as about 1 hour. While a preferred embodiment of the process can be carried out in short time periods, variations in the process will be apparent to those skilled in the art. The process can also use readily available, inexpensive precursors. Moreover, the process can be easily scaled up, to make larger quantities of the nanocomposite copper-ceria catalyst.

The nanocomposite copper-ceria catalyst can be used in a wide variety of applications. In one preferred embodiment, the nanocomposite copper-ceria catalyst is used in cut filler compositions, smoking articles and cigarette filters, for the purposes of reducing the amount of one or more selected constituents in tobacco smoke, such as mainstream tobacco smoke or sidestream tobacco smoke. The term "mainstream" smoke refers to the mixture of gases passing down the tobacco rod and issuing through the filter end, i.e. the amount of smoke issuing or drawn from the mouth end of a smoking article during smoking. The term "sidestream" includes smoke given off into the surrounding air, that does not exit through the mouth end of the smoking article. The nanocomposite copper-ceria catalyst can reduce the amount of one or more constituents from mainstream smoke, i.e. by catalyzing a reaction whereby the constituent is converted into another product. For instance, the catalyst may convert carbon monoxide into carbon dioxide, convert nitric oxide to nitrogen and/or convert hydrocarbons.

Examples of smoking articles include, but are not limited to cigarettes, pipes, and cigars, as well as non-traditional cigarettes. Non-traditional cigarettes include, for example, cigarettes for electrical smoking systems as described in commonly-assigned U.S. Pat. Nos. 6,026,820; 5,988,176; 5,915, 387; 5,692,526; 5,692,525; 5,666,976; and 5,499,636. The nanocomposite copper-ceria catalyst can either be dispersed in the smoking material or incorporated into a filter arrangement and/or into cigarette paper.

Such smoking articles and cigarette filters preferably comprise the nanocomposite copper-ceria catalyst in an amount effective to convert at least 30% of carbon monoxide in mainstream tobacco smoke, at least 30% of nitric oxide in mainstream tobacco smoke, and/or at least 30% of hydrocarbons in mainstream tobacco smoke. Preferably, such smoking articles and cigarette filters comprise from about 5 mg to about 200 mg of nanocomposite copper-ceria catalyst, or more preferably greater than about 50 mg of the nanocomposite copper-ceria catalyst. Examples of smoking articles include, but are not limited to, the group consisting of cigarette, pipe, cigar and non-traditional cigarette. In a preferred embodiment, the smoking article is a cigarette.

In another preferred embodiment, a cigarette filter comprising the nanocomposite copper-ceria catalyst may be a mono filter, a dual filter, a triple filter, a cavity filter, a recessed filter or a free-flow filter. Preferably, the nanocomposite copper-ceria catalyst is incorporated into one or more cigarette filter parts selected from the group consisting of: tipping paper, shaped paper insert, a plug, a space between plugs, cigarette filter paper, a cellulose acetate sleeve, a polypropylene sleeve, and a free-flow sleeve.

The invention also relates to methods for making a cigarette filter, comprising incorporating a nanocomposite copper-ceria catalyst for low-temperature oxidation of at least one constituent in mainstream tobacco smoke into a cigarette filter. Any conventional or modified method of making cigarette filters may be used to incorporate the nanocomposite copper-ceria catalyst. For example,. various cigarette filter arrangements and methods for making filters are described in commonly-assigned U.S. Pat. No. 6,209,547, which is hereby incorporated in its entirety.

Figure 8:
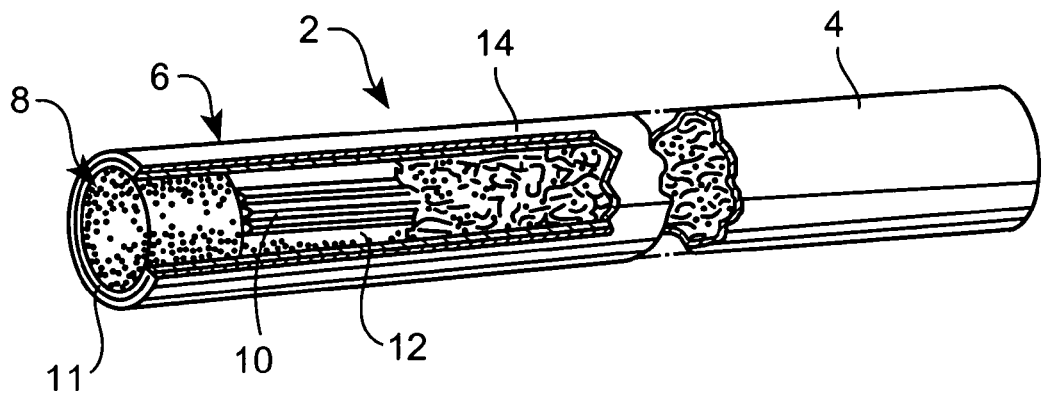
FIG. 8 is a partially exploded perspective view of a cigarette incorporating one embodiment of the present invention wherein folded paper containing a nanocomposite copper-ceria catalyst is inserted into a hollow portion of a tubular filter element of the cigarette.

FIG. 8 illustrates a cigarette 2 having a tobacco rod 4, a filter portion 6, and a mouthpiece filter plug 8. As shown, a nanocomposite copper-ceria catalyst can be loaded onto folded paper 10 inserted into a hollow cavity such as the interior of a free-flow sleeve 12 forming part of the filter portion 6.

Figure 9:
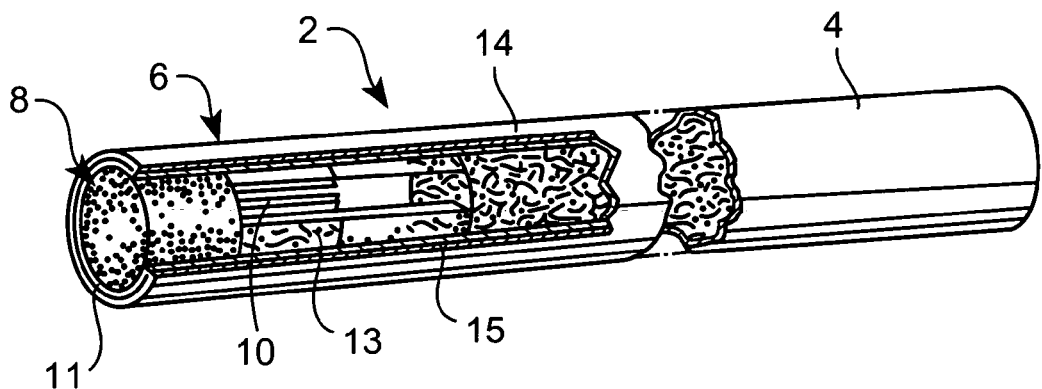
FIG. 9 is a partially exploded perspective view of another embodiment of the present invention wherein a nanocomposite copper-ceria catalyst is incorporated in folded paper and inserted into a hollow portion of a first free-flow sleeve of a tubular filter element next to a second free-flow sleeve.

FIG. 9 shows a cigarette 2 having a tobacco rod 4 and a filter portion 6, wherein the folded paper 10 is located in the hollow cavity of a first free-flow sleeve 13 located between the mouthpiece filter 8 and a second free-flow sleeve 15. The paper 10 can be used in forms other than as a folded sheet. For instance, the paper 10 can be deployed as one or more individual strips, a wound roll, etc. In whichever form, a desired amount of a nanocomposite copper-ceria catalyst can be provided in the cigarette filter portion by a combination of the coated amount of reagent/area of the paper and/or the total area of coated paper employed in the filter (e.g., higher amounts of a nanocomposite copper-ceria catalyst can be provided simply by using larger pieces of coated paper). In the cigarettes shown in FIGS. 8 and 9, the tobacco rod 4 and the filter portion 6 are joined together with tipping paper 14. In both cigarettes, the filter portion 6 may be held together by filter plug wrap 11.

A nanocomposite copper-ceria catalyst can be incorporated into the filter paper in a number of ways. For example, a nanocomposite copper-ceria catalyst can be mixed with water to form a slurry. The slurry can then be coated onto pre-formed filter paper and allowed to dry. The filter paper can then be incorporated into the filter portion of a cigarette in the manner shown in FIGS. 8 and 9. Alternatively, the dried paper can be wrapped into a plug shape and inserted into a filter portion of the cigarette. For example, the paper can be wrapped into a plug shape and inserted as a plug into the interior of a free-flow filter element such as a polypropylene or cellulose acetate sleeve. In another arrangement, the paper can comprise an inner liner of such a free-flow filter element.

Alternatively and preferably, a nanocomposite copper-ceria catalyst is added to the filter paper during the paper-making process. For example, a nanocomposite copper-ceria catalyst can be mixed with bulk cellulose to form a cellulose pulp mixture. The mixture can be then formed into filter paper according to any conventional or modified methods.

Figure 10:
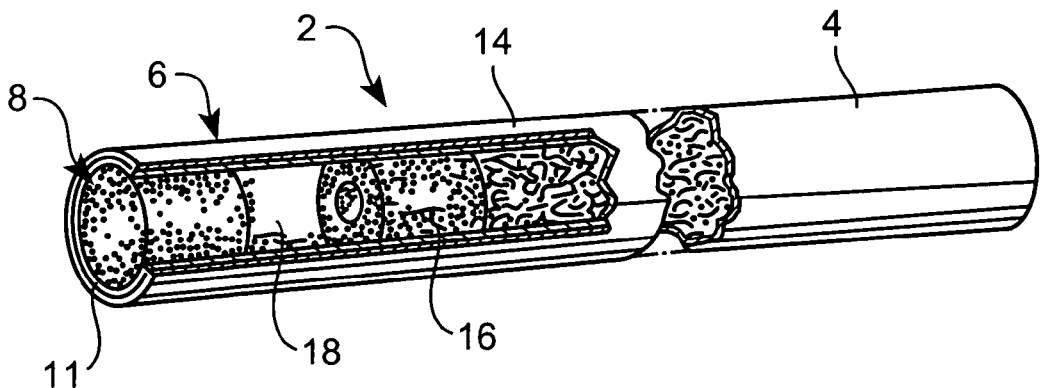
FIG. 10 is a partially exploded perspective view of another embodiment of the present invention wherein a nanocomposite copper-ceria catalyst is incorporated in a plug-space-plug filter element.

In another preferred embodiment, a nanocomposite copper-ceria catalyst is incorporated into the fibrous material of the cigarette filter portion itself. Such filter materials include, but are not limited to, fibrous filter materials including paper, cellulose acetate fibers, and polypropylene fibers. This embodiment is illustrated in FIG. 10, which shows a cigarette 2 comprised of a tobacco rod 4 and a filter portion 6 in the form of a plug-space-plug filter having a mouthpiece filter 8, a plug 16, and a space 18. The plug 16 can comprise a tube or solid piece of material such as polypropylene or cellulose acetate fibers. The tobacco rod 4 and the filter portion 6 are joined together with tipping paper 14. The filter portion 6 may include a filter plug wrap 11. The filter plug wrap 11 containing traditional fibrous filter material and a nanocomposite copper-ceria catalyst can be incorporated in or on the filter plug wrap 11 such as by being coated thereon. Alternatively, a nanocomposite copper-ceria catalyst can be incorporated in the mouthpiece filter 8, in the plug 16, and/or in the space 18. Moreover, a nanocomposite copper-ceria catalyst can be incorporated in any element of the filter portion of a cigarette. For example, the filter portion may consist only of the mouthpiece filter 8 and a nanocomposite copper-ceria catalyst can be incorporated in the mouthpiece filter 8 and/or in the tipping paper 14.

Figure 11:
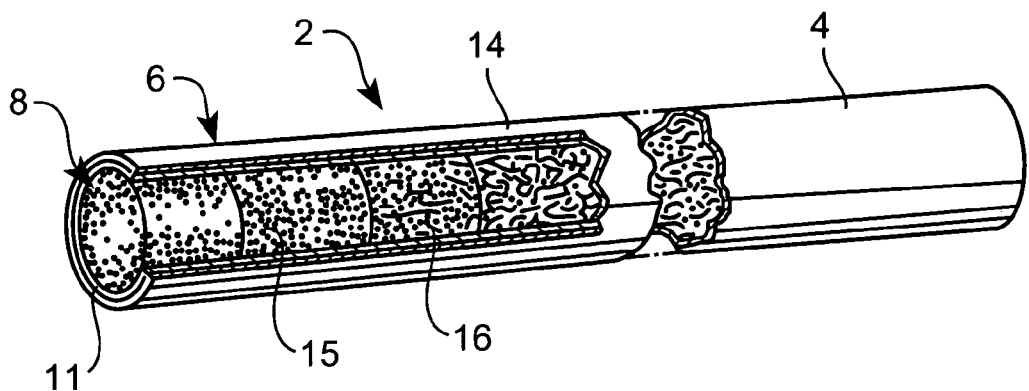
FIG. 11 is a partially exploded perspective view of another embodiment of the present invention wherein a nanocomposite copper-ceria catalyst is incorporated in a three-piece filter element having three plugs.

FIG. 11 shows a cigarette 2 comprised of a tobacco rod 4 and filter portion 6. This arrangement is similar to that of FIG. 10 except the space 18 is filled with granules of a nanocomposite copper-ceria catalyst or a plug 15 made of material such as fibrous polypropylene or cellulose acetate containing the nanocomposite copper-ceria catalyst. Such granules preferably comprise granules of support material on which the nanocomposite copper-ceria catalyst material is supported. As in the previous embodiment, the plug 16 can be hollow or solid and the tobacco rod 4 and filter portion 6 are joined together with tipping paper 14. There is also a filter plug wrap 11.

Figure 12:
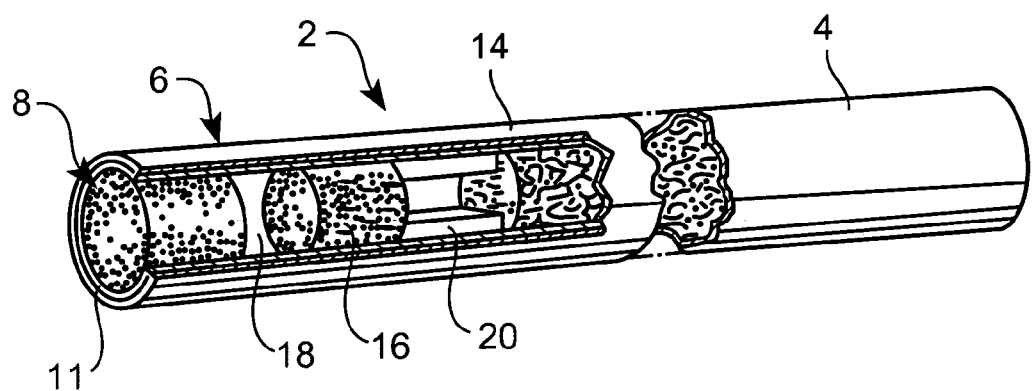
FIG. 12 is a partially exploded perspective view of another embodiment of the present invention wherein a nanocomposite copper-ceria catalyst is incorporated in a four-piece filter element having a plug-space-plug arrangement and a hollow sleeve.

FIG. 12 shows a cigarette 2 comprised of a tobacco rod 4 and a filter portion 6, wherein the filter portion 6 includes a mouthpiece filter 8, a filter plug wrap 11, tipping paper 14 to join the tobacco rod 4 and filter portion 6, a space 18, a plug 16, and a hollow sleeve 20. A nanocomposite copper-ceria catalyst can be incorporated into one or more elements of the filter portion 6. For instance, a nanocomposite copper-ceria catalyst can be incorporated into the sleeve 20 or granules on which the nanocomposite copper-ceria catalyst material is supported can be filled into the space within the sleeve 20. If desired, the plug 16 and sleeve 20 can be made of material such as fibrous polypropylene or cellulose acetate containing the nanocomposite copper-ceria catalyst. As in the previous embodiment, the plug 16 can be hollow or solid.

Figure 13:
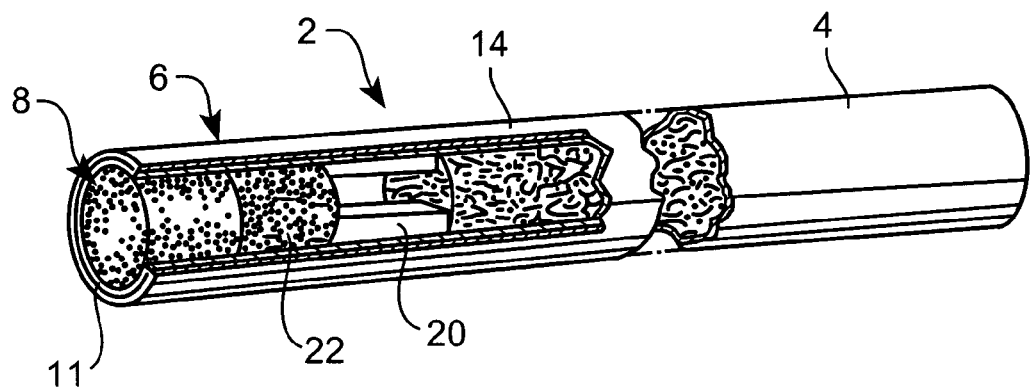
FIG. 13 is a partially exploded perspective view of another embodiment of the present invention wherein a nanocomposite copper-ceria catalyst is incorporated in a three-part filter element having two plugs and a hollow sleeve.
Figure 14:
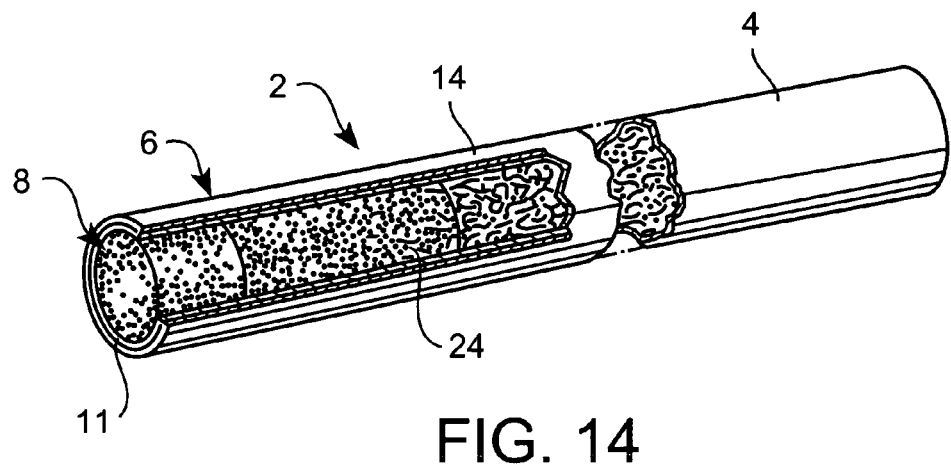
FIG. 14 is a partially exploded perspective view of another embodiment of the present invention wherein a nanocomposite copper-ceria catalyst is incorporated in a two-part filter element having two plugs.

FIGS. 13 and 14 show further modifications of the filter portion 6. In FIG. 13, cigarette 2 is comprised of a tobacco rod 4 and filter portion 6. The filter portion 6 includes a mouthpiece filter 8, a filter plug wrap 11, a plug 22, and a sleeve 20, and a nanocomposite copper-ceria catalyst can be incorporated in one or more of these filter elements. In FIG. 14, the filter portion 6 includes a mouthpiece filter 8 and a plug 24, and a nanocomposite copper-ceria catalyst can be incorporated in one or more of these filter elements. Like the plug 16, the plugs 22 and 24 can be solid or hollow. In the cigarettes shown in FIGS. 13 and 14, the tobacco rod 4 and filter portion 6 are joined together by tipping paper 14.

Various techniques can be used to apply a nanocomposite copper-ceria catalyst to filter fibers or other substrate supports. For example, a nanocomposite copper-ceria catalyst can be added to the filter fibers before they are formed into a filter cartridge, e.g., a tip for a cigarette. A nanocomposite copper-ceria catalyst can be added to the filter fibers, for example, in the form of a dry powder or a slurry. If a nanocomposite copper-ceria catalyst is applied in the form of a slurry, the fibers are allowed to dry before they are formed into a filter cartridge.

In another preferred embodiment, a nanocomposite copper-ceria catalyst is employed in a hollow portion of a cigarette filter. For example, some cigarette filters have a plug/space/plug configuration in which the plugs comprise a fibrous filter material and the space is simply a void between the two filter plugs. That void can be filled with the nanocomposite copper-ceria catalyst. An example of this embodiment is shown in FIG. 10. The nanocomposite copper-ceria catalyst can be supported on granules or can be loaded onto a suitable support such as a fiber or thread.

Figure 15:
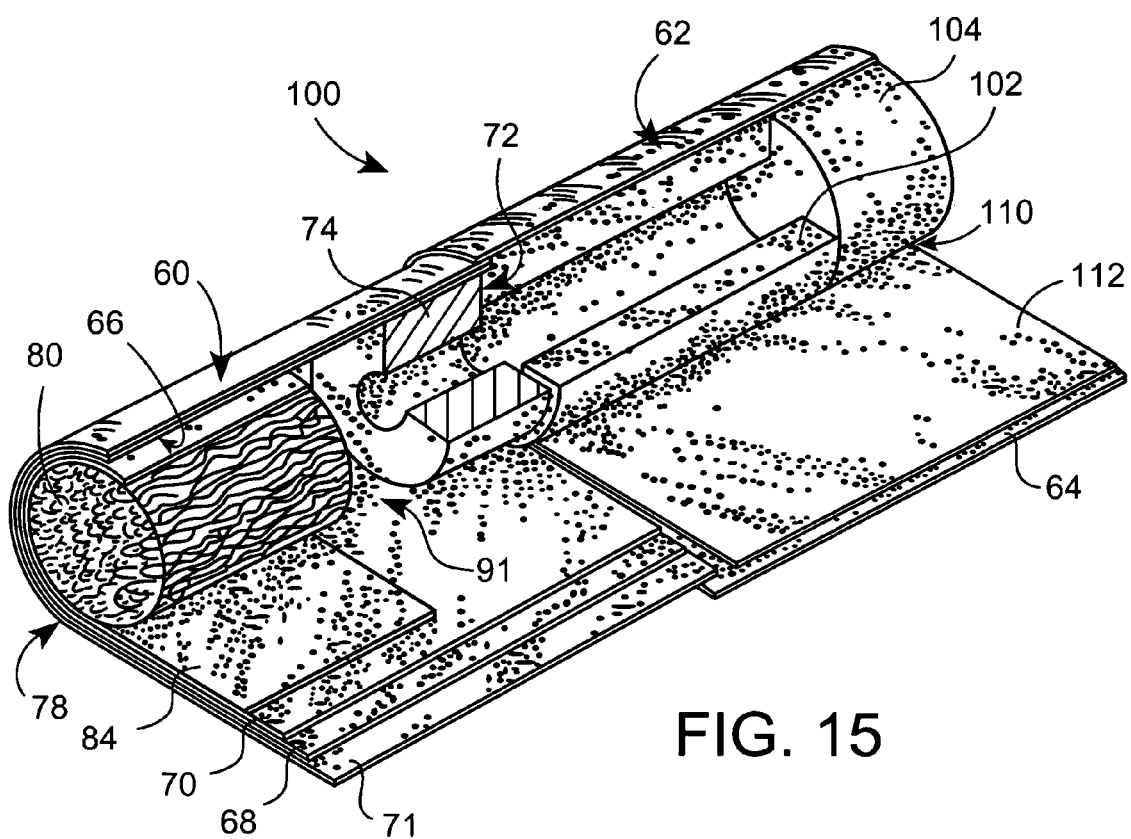
FIG. 15 is a partially exploded perspective view of another embodiment of the present invention wherein a nanocomposite copper-ceria catalyst is incorporated in a filter element which may be used in a smoking article.

In another embodiment, the nanocomposite copper-ceria catalyst is employed in a filter portion of a cigarette for use with a smoking device as described in commonly-assigned U.S. Pat. No. 5,692,525, the entire content of which is hereby incorporated by reference. FIG. 15 illustrates one type of construction of a cigarette 100 which can be used with an electrical smoking device. As shown, the cigarette 100 includes a tobacco rod 60 and a filter portion 62 joined by tipping paper 64. The filter portion 62 preferably contains a tubular free-flow filter element 102 and a mouthpiece filter plug 104. The free-flow filter element 102 and mouthpiece filter plug 104 may be joined together as a combined plug 110 with plug wrap 112. The tobacco rod 60 can have various forms incorporating one or more of the following items: an plug wrap 71, another tubular free-flow filter element 74, a cylindrical tobacco plug 80 preferably wrapped in a plug wrap 84, a tobacco web 66 comprising a base web 68 and tobacco flavor material 70, and a void space 91. The free-flow filter element 74 provides structural definition and support at the tipped end 72 of the tobacco rod 60. At the free end 78 of the tobacco rod 60, the tobacco web 66 together with plug wrap 71 are wrapped about cylindrical tobacco plug 80. Various modifications can be made to a filter arrangement for such a cigarette incorporating a nanocomposite copper-ceria catalyst of the invention.

In such a cigarette, a nanocomposite copper-ceria catalyst can be incorporated in various ways such as by being loaded onto paper or other substrate material which is fitted into the passageway of the tubular free-flow filter element 102 therein. It may also be deployed as a liner or a plug in the interior of the tubular free-flow filter element 102. Alternatively, a nanocomposite copper-ceria catalyst can be incorporated into the fibrous wall portions of the tubular free-flow filter element 102 itself. For instance, the tubular free-flow filter element or sleeve 102 can be made of suitable materials such as polypropylene or cellulose acetate fibers and a nanocomposite copper-ceria catalyst can be mixed with such fibers prior to or as part of the sleeve forming process.

In another embodiment, a nanocomposite copper-ceria catalyst can be incorporated into the mouthpiece filter plug 104 instead of in the element 102. However, as in the previously described embodiments, according to the invention, a nanocomposite copper-ceria catalyst may be incorporated into more than one constituent of a filter portion such as by being incorporated into the mouthpiece filter plug 104 and into the tubular free-flow filter element 102. The filter portion 62 of FIG. 15 can also be modified to create a void space into which a nanocomposite copper-ceria catalyst can be inserted.

As explained above, the nanocomposite copper-ceria catalyst can be incorporated in various support materials. When a nanocomposite copper-ceria catalyst is used in filter paper, the catalyst material may be supported on filler particles that have an average particle size of up to 100 μm, preferably less than 30 μm. Larger filler particles on which the nanocomposite copper-ceria catalyst material is supported may also be used in granular form. Such particles preferably have a mesh size of from 18 to 60 mesh (1000 to 250 microns, U.S. Standard, ASTM E11), and more preferably from 18 to 50 mesh (1000 to 300 microns).

Examples of suitable types of tobacco materials which may be used in the cut filler compositions and the smoking articles include flue-cured, Burley, Maryland or Oriental tobaccos, the rare or specialty tobaccos, and blends thereof. The tobacco material can be provided in the form of tobacco lamina; processed tobacco materials such as volume expanded or puffed tobacco, processed tobacco stems such as cut-rolled or cut-puffed stems, reconstituted tobacco materials; or blends thereof. The invention may also be practiced with tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

Techniques for cigarette manufacture are known in the art, and may be used to incorporate the nanocomposite copper-ceria catalyst. The resulting cigarettes can be manufactured to any desired specification using standard or modified cigarette making techniques and equipment. The cigarettes of the invention may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm in circumference, and preferably around 25 mm. The packing density is typically between the range of about 100 mg/cm$^3$ to about 300 mg/cm$^3$, and preferably 150 mg/cm$^3$ to about 275 mg/cm$^3$.

In yet another embodiment, the invention relates to methods for smoking a cigarette comprising the nanocomposite copper-ceria catalyst, comprising lighting the cigarette to form smoke and drawing the smoke through the cigarette, wherein during the smoking of the cigarette, the nanocomposite copper-ceria catalyst acts as a catalyst; for the oxidation of at least one constituent in mainstream tobacco smoke.

"Smoking" of a smoking article means the heating or combustion of the cigarette to form smoke, which can be drawn in through the smoking article. Generally, smoking of a cigarette involves lighting one end of the cigarette and drawing the smoke through the mouth end of the cigarette, while the tobacco contained therein undergoes a combustion reaction. However, the cigarette may also be smoked by other means. For example, the cigarette may be smoked by heating the cigarette and/or heating using electrical heater means, as described in commonly-assigned U.S. Pat. Nos. 6,026,820; 5,988,176; 5,915,387; 5,692,526; 5,692,525; 5,666,976; and 5,499,636, for example.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A method for making a nanocomposite copper-ceria catalyst, comprising:
   (i) combining ceria nanoparticles in an aqueous suspension with copper 2,4-pentanedionate to form a slurry;
   (ii) heating the slurry formed in step (i) under an inert gas atmosphere or an oxygen-argon atmosphere, at a temperature and for a time sufficient to cause decomposition of the copper 2,4-pentanedionate to form copper nanoparticles and/or copper oxide nanoparticles that are combined with the ceria nanoparticles; and
   (iii) optionally, subjecting the product formed in step (ii) to a heat treatment process under conditions effective to convert at least some of the copper nanoparticles to copper oxide nanoparticles;
   wherein the nanocomposite copper-ceria catalyst produced comprises copper oxide nanoparticles, copper nanoparticles, or a mixture thereof combined with the ceria nanoparticles.

2. The method of claim 1, wherein the nanocomposite copper-ceria catalyst is capable of catalyzing reactions at temperatures below about 200° C.

3. The method of claim 2, wherein the nanocomposite copper-ceria catalyst is capable of catalyzing reactions at temperatures below about 100° C.

4. The method of claim 3, wherein the nanocomposite copper-ceria catalyst is capable of catalyzing reactions at temperatures below about 30° C.

5. The method of claim 1, wherein the nanocomposite copper-ceria catalyst is capable of catalyzing oxidation reactions, reduction reactions, and/or hydrocarbon conversion reactions.

6. The method of claim 5, wherein the nanocomposite copper-ceria catalyst is capable of catalyzing the oxidation of carbon monoxide to carbon dioxide and/or the reduction of nitric oxide to nitrogen.

7. The method of claim 1, wherein the ceria nanoparticles of step (i) are provided in the form of a precursor that is converted into ceria nanoparticles.

8. The method of claim 7, wherein a cerium 2,4-pentanedionate precursor is used in step (i) as a source of ceria nanoparticles.

9. The method of claim 1, wherein the nanocomposite copper-ceria catalyst comprises from about 0.4% by weight to about 70% by weight of copper in the form of copper oxide and/or copper.

10. The method of claim 9, wherein the nanocomposite copper-ceria catalyst comprises from about 1% by weight to about 20% by weight of copper in the form of copper oxide and/or copper.

11. The method of claim 1, wherein the nanocomposite copper-ceria catalyst has a surface area from about 50 $m^2$/gram to about 250 $m^2$/gram.

12. The method of claim 11, wherein the nanocomposite copper-ceria catalyst has a surface area from about 100 $m^2$/gram to about 200 $m^2$/gram.

13. The method of claim 1, wherein the nanocomposite copper-ceria catalyst is less than about 500 nm in size.

14. The method of claim 13, wherein the nanocomposite copper-ceria catalyst has a particle size of less than about 100 nm.

15. The method of claim 14, wherein the nanocomposite copper-ceria catalyst has a particle size of less than about 10 nm.

16. The method of claim 15, wherein the nanocomposite copper-ceria catalyst has a particle size of less than about 5 nm.

17. The method of claim 1, which includes said step (iii), and wherein steps (i), (ii) and (iii) are completed in about 2 hours to about 5 hours.

18. The method of claim 1, which includes said step (iii) and wherein said heat treatment process comprises heating the product from step (ii) in open air at a temperature of about 300° C. to about 400° C. for a time sufficient to convert at least some of the copper nanoparticles to copper oxide nanoparticles.

19. The method of claim 1, which includes said step (iii) is not optional and wherein said heat treatment process comprises heating the product from step (ii) in an oxygen-argon gas mixture at a temperature of about 300° C. to about 400° C. for a time sufficient to convert at least some of the copper nanoparticles to copper oxide nanoparticles.

20. The method of claim 19, wherein the oxygen-argon gas mixture comprises from about 1% by volume to about 10% by volume oxygen gas.

21. The method of claim 1, which includes said step (iii) wherein said heat treatment process comprises heating the product from step (ii) in a carbon monoxide-oxygen-argon gas mixture in a tube reactor, where the tube reactor is initially at ambient temperature and heated at a rate of about 10° C. per minute until a final temperature of about 250° C. is achieved.

22. The method of claim 21, wherein the carbon monoxide-oxygen-argon gas mixture comprises from about 1% by volume to about 10% by volume carbon monoxide and 10% by volume to about 30% oxygen gas.

23. The method of claim 1, further comprising the step of combining the nanocomposite copper-ceria catalyst with a catalyst support.

24. The method of claim 23, wherein the catalyst support is selected from the group consisting of ceramics, organic polymers, inorganic polymers, zeolites, glasses, metals, carbons, and mixtures thereof in the form of a monolith, nanosized particles or micron sized particles.

25. The method of claim 23, wherein the catalyst support is selected from the group consisting of aluminum, alumina, titanium, titania, zirconia, magnesia, silica, silica gel, activated carbon, carbon fibers, carbon foam, and mixtures thereof in the form of a monolith, nanosized particles or micron sized particles.

* * * * *